July 4, 1972 H. M. NEUHAUS 3,674,407
EXTRUSION PRESS AND BARREL
Filed Nov. 16, 1970 2 Sheets-Sheet 1

INVENTOR.
HERBERT M. NEUHAUS
BY Thomas O. Watson Jr.
ATTORNEY

United States Patent Office 3,674,407
Patented July 4, 1972

3,674,407
EXTRUSION PRESS AND BARREL
Herbert M. Neuhaus, China Lake, Calif., assignor to the United States of America as represented by the Secretary of the Navy
Filed Nov. 16, 1970, Ser. No. 89,739
Int. Cl. B29f 3/00
U.S. Cl. 425—378   6 Claims

ABSTRACT OF THE DISCLOSURE

A press and interchangeable barrel for extruding explosive and plastic materials in continuous strands of predetermined cross-section. The barrel, which contains the raw material to be worked upon, is held at a uniform temperature by a coil. A counter flow of heating or cooling fluid is provided in the coil by wrapping it around the barrel such that it turns back upon itself. This provision of counter flow, in the coil, permits precise temperature to be held. The mass of the barrel wall also aids in maintaining a uniform barrel temperature.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to extrusion presses and more particularly to interchangeable temperature controlled barrels in such presses.

Prior attempts at extruding explosives and plastic materials have included the use of simple hydraulic presses which extruded shapes but were unable to maintain consistent extrusions due to uneven temperatures of the product being worked upon. Further, such devices have lacked the versatility for changeover from one cross-section to another.

SUMMARY OF THE INVENTION

The present invention provides a means for obtaining uniform quality in extruded materials. This is primarily accomplished, by obtaining a uniform temperature throughout the material being worked upon and holding this temperature throughout the processing. The extrusion barrel is wrapped with a coil which turns back upon itself to maintain a constant temperature between the top and the bottom of the barrel. Either heating or cooling fluids may be used in the coil as required by the particular application.

The present invention also provides a changeover flexibility heretofore unattainable. The barrel, ram, and die are all designed to be easily interchangeable to conform to varied requirements in the final product.

OBJECTS OF THE INVENTION

An object of the present invention is the provision of an extrusion press capable of maintaining a uniform quality in the extruded product.

Another object is to provide an extrusion press capable of duplicating the product of a previous extrusion.

A further object of the invention is the provision of a barrel for an extrusion press which is capable of maintaining its contents at a uniform temperature.

Still another object is to provide an extrusion press the parts of which are easily interchangeable to meet the requirements of a particular end product.

Other objects, advantages and novel features of the invention will become apparent from the following detailed description of the invention when considered in conjunction with the accompanying drawings.

DESCRIPTION OF THE PREFERRED EMBODIMENT

Figure 1:
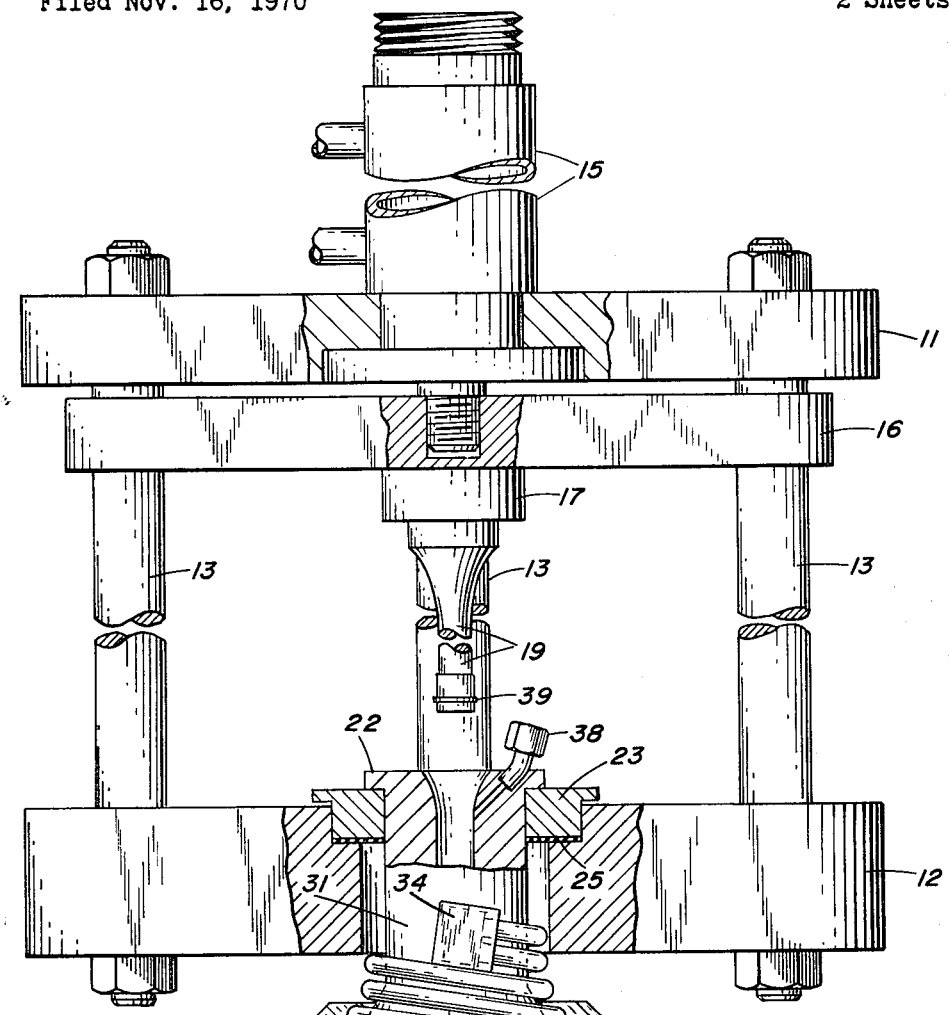
FIG. 1 shows a partial cutaway of a preferred embodiment of the present invention.

FIG. 1, which illustrates a preferred embodiemnt of the invention, shows a top plate 11 and a bottom plate 12 separated by guide posts 13. Mounted on top of the plate 11, is a hydraulic cylinder 15 of conventional design.

Located on the under side of the top plate 11 and slidably arranged on the guide posts 13 is movable cross head 16. The cross head 16 has a center extension 17 which engages a ram punch 19. A typical form of engagement between the center extension 17 and the ram punch 19 would be the use of screw threads.

The use of the guide posts 13 and the cross head 16 allows a precise alignment of the ram punch 19. Further, the threaded engagement between the ram punch 19 and center extension 17 provides for easy interchangeability from one punch to another.

Figure 3:
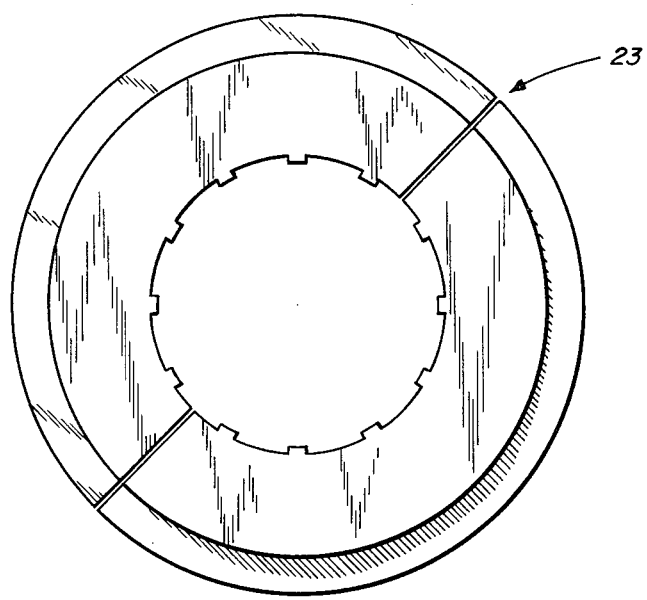
FIG. 3 shows the details of an element of the embodiment of FIG. 1.

Suspended from the bottom plate 12 is an extrusion barrel 21. The top of the barrel 21 is provided with a barrel collar 22. Positioned between the barrel collar 22 and the bottom plate 12 is a holding collar 23. The barrel collar 22, holding collar 23 and bottom plate 12 engage each other to maintain the extrusion barrel 21 in its operative position. The holding collar 23 is made in two parts to facilitate placement and removal of the extrusion barrel 21 (see FIG. 3). An insulating spacer 25 is positioned between the holding collar 23 and the bottom plate 12 to minimize heat losses to the remainder of the press.

Located at the lower end of the extrusion barrel 21 is a die 27 and die locking nut 28. The die is contoured to give whatever cross section is desired to the strand being forced through it. The die locking nut 28 holds the die 27 in place. O rings 29 give the die safety against possible extrusion losses and, with a rubber stopper or plug in the barrel collar opening, a vacuum may be drawn on the barrel chamber and its contents through vacuum coupling 38 in a manner to be described below.

Referring now to the lower portion of FIG. 1, there is shown a generally cyclindrical chamber member 31. A sleeve 32 surrounds the lower portion of the chamber member 31 and a coil 33 is attached to this sleeve 32 in any suitable manner such as by sweating or brazing. The coil consists of two parallel helical windings which are joined by a return manifold 34 in such a manner that a fluid entering one of the windings is caused to reverse its direction of flow through the second winding. This novel manner of winding allows a precise temperature maintenance. Temperature wells 35 allow a temperature sensing device, such as a thermocouple, to be used to provide a constant temperature survey of the working material within the extrusion barrel chamber.

An insulating layer 37 is wrapped around the entire barrel coil assembly to minimize heat losses. Asbestos has been used for this application but, any other suitable insulating materials may also be used.

Figure 2:
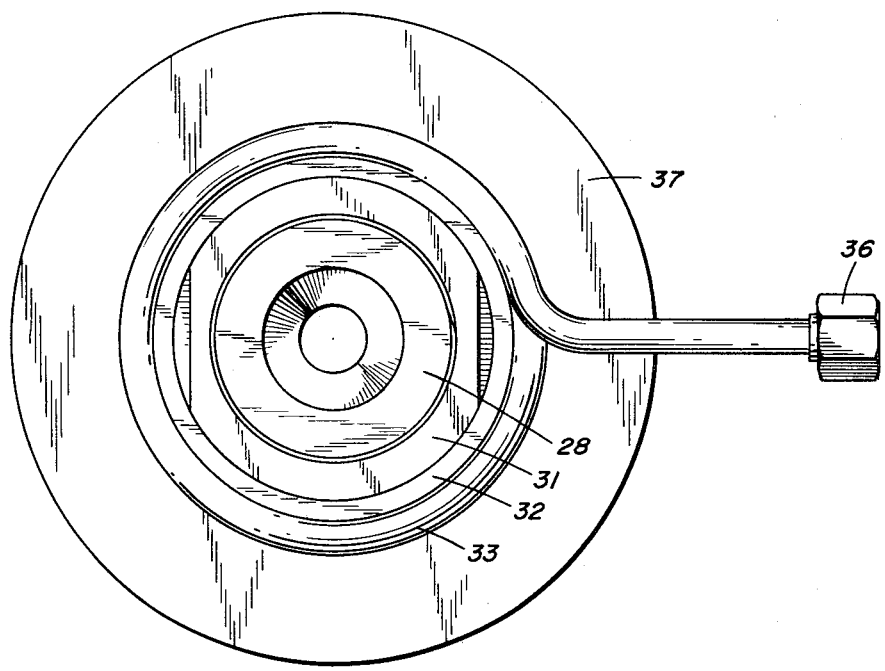
FIG. 2 shows a bottom view of the embodiment of FIG. 1.

As shown in FIGS. 1 and 2, the coil windings both terminate in a fluid coupling 36. Through these couplings 36 the coil windings are connected to an external fluid source (not shown) which is capable of providing a fluid suitably heated or cooled for the requirements of the operation.

In operation, the barrel chamber is loaded with the material to be extruded. The ram punch 19 enters the barrel by application of hydraulic pressure from hydraulic cylinder 15. Travel of the punch 19 is stopped when the O-rings 39 on the punch tip enter the chamber. A vacuum is then applied through a vacuum coupling 38. When the required degree of vacuum is reached, pressure is again applied by the hydraulic cylinder 15 and the ram punch 19 travels downward. The contents of the barrel are then compacted and with increasing pressure are forced to leave the chamber via the die 27. Prior to applying pressure with the ram punch 19 and during the extrusion process, the chamber is heated or cooled by circulation of a fluid through the coil 33.

The extrusion press of the present invention is more substantially aligned than prior art devices as the ram 19 and barrel 21 are constantly in line through action of the guide posts 13 and cross head 16. The provision of counter flow in the heating and cooling coils 33 permits precise temperatures to be held in the barrel 21 while the insulating spacer 25 and holding collar 23 minimizes heat or "cold" loss. The "mass" of the barrel also lends itself to holding temperature and maintaining uniformity of temperature throughout the chamber.

A means for rapid exchange of barrels and chambers of different sizes is provided by the holding collar 23 and the mounting of the ram punch 19 in the cross head 16 also permits replacement of the ram to suit the barrel being used. These changes may all be undertaken without defeating the ability to change dies or to draw and hold a vacuum in the barrel chamber.

The press of the present invention may be operated either in a vertical position (not shown) or horizontally. In the horizontal position, clamps may be required to fasten the holding collar 23 to the bottom plate 12 to prevent it from falling out. Also, pressure on the ram punch 19 may be exerted by means other than hydraulic such as by air, gas or mechanical systems such as a rack and pinion arrangement. Obviously many other modifications and variations of the present invention are possible in light of the above teachings. It is therefor to be understood that, within the scope of the appended claims, the invention may be practical otherwise than as specifically described.

What is claimed is:

1. An extrusion press which comprises:
   a bottom plate having a centrally located stepped bore;
   a barrel having an internal bore extending therethrough, said barrel also having a first collar at one end, said first collar and barrel extending through said stepped bore, the outermost dimensions of said first collar being less than the innermost dimensions of the stepped bore;
   a split holding collar having an upper end surface and lower end surface, said lower end surface resting in said stepped bore and said upper end surface surrounding said barrel beneath said first collar, and said first collar resting on said upper end surface to prevent the first collar from passing through the stepped bore;
   said split holding collar being in two distinct halves;
   an extrusion die mounted within said internal bore at the other end of the barrel;
   a top plate;
   guide posts connecting said top plate and said bottom plate;
   a movable cross head slidably mounted on said guide posts;
   a ram punch aligned with said internal bore mounted on said cross head; and
   means for driving said cross head and ram punch.

2. The extrusion press of claim 1 further comprising a first fluid coil and a second fluid coil spirally wrapped in parallel around said barrel;
   said first fluid coil having a first entrance adjacent said one end and a first exit adjacent said other end of said barrel;
   said second fluid coil having a second exit adjacent said one end and a second entrance adjacent said other end of said barrel; and
   a manifold adjacent said one end of said barrel connecting said first entrance and said second exit.

3. The extrusion press of claim 2 wherein said internal bore has a stepped portion at said other end and said extrusion die is mounted within said stepped portion and held in position by a threaded locking nut, said locking nut engaging complementary threads on said barrel.

4. The extrusion press of claim 3 further comprising a vacuum coupling, said coupling attached to a passage in said barrel; and said passage being in communication with said internal bore.

5. The extrusion press of claim 4 wherein there are at least three guide posts.

6. The extrusion press of claim 1 wherein said internal bore has a stepped portion at said other end and said extrusion die is mounted within said stepped portion and held in position by a threaded locking nut, said locking nut engaging complementary threads on said barrel.

References Cited
UNITED STATES PATENTS

| | | | |
|---|---|---|---|
| 2,171,095 | 8/1939 | Orsini | 18—12 P X |
| 2,587,930 | 3/1952 | Uschmann | 18—12 P |
| 2,533,468 | 12/1950 | Jurgeleit | 18—12 P UX |
| 2,286,501 | 6/1942 | Narten | 18—12 P |
| 2,651,952 | 9/1953 | Leavenworth | 18—12 P |
| 2,443,586 | 6/1948 | Stuart | 18—12 P |
| 2,814,070 | 11/1957 | Bulkley | 18—12 P |

H. A. KILBY, Jr., Primary Examiner

U.S. Cl. X.R.

425—243, 405, 449